United States Patent [19]

Fillipova

[11] Patent Number: 5,370,891

[45] Date of Patent: Dec. 6, 1994

[54] PRODUCTION OF VODKA

[75] Inventor: Irina V. Fillipova, Bethlehem, Pa.

[73] Assignee: RTD Corporation, Bethlehem, Pa.

[21] Appl. No.: 83,979

[22] Filed: Jun. 28, 1993

[51] Int. Cl.$^5$ .......................... C12G 3/08; C12G 3/04
[52] U.S. Cl. .................................... 426/422; 426/490
[58] Field of Search ................... 426/422, 490; 502/56, 502/514, 515, 518

[56] References Cited

U.S. PATENT DOCUMENTS

| | | |
|---|---|---|
| 2,946,687 | 7/1960 | Jacobs . |
| 3,914,442 | 10/1975 | Servadio et al. . |
| 3,930,042 | 12/1975 | Dunnet . |
| 4,086,366 | 4/1978 | Antonov et al. . |
| 4,877,772 | 10/1989 | Mudzihiri et al. . |

FOREIGN PATENT DOCUMENTS

| | | |
|---|---|---|
| 5698638 | 3/1983 | Japan . |
| 2216139 | 4/1989 | United Kingdom . |

*Primary Examiner*—Donald E. Czaja
*Assistant Examiner*—Curtis E. Sherrer

[57] ABSTRACT

A method of treating a mixture of ethyl alcohol and water for the reduction of impurities comprising the steps of:

a) mixing ethyl alcohol and water at a temperature of from about 5° C. to about 10° C. to obtain a mixture;

b) flowing the mixture at a temperature of from about 5° C. to about 20° C. through three layers of an activated charcoal adsorber having surface activities of
  1) from about 0.6 to about 0.8 mg-equivalent/liter,
  2) from about 0.8 to about 1.0 mg-equivalent/liter, and
  3) from about 1.0 to about 1.4 mg-equivalent/liter respectively, and a total pore volume of from about 1.4 to 1.6 cm$^3$/g;

c) allowing the mixture to contact the activated charcoal adsorber for about 2 to 15 minutes, preferably for about 5 to 10 minutes; and d) recovering the initial capacity of the activated charcoal adsorber by flowing a stream of dry air, having a temperature of from about 100° C. to about 400° C., through the activated charcoal adsorber.

3 Claims, No Drawings

PRODUCTION OF VODKA

BACKGROUND OF THE INVENTION
FIELD OF THE INVENTION

This invention relates to a process for the treatment of aqueous ethyl alcohol for the removal of impurities therefrom. More particularly, the invention relates to a process for the treatment of aqueous ethyl alcohol for the removal of impurities while maintaining desirable organoleptic qualities to provide an improved quality, high alcoholic content beverage known as vodka.

REPORTED DEVELOPMENTS

Ethyl alcohol has been known and made since prehistoric times by fermentation of sugars using a yeast which changes the sugars into alcohol and carbon dioxide. The source of sugars is a cereal, such as potato and grain (wheat). The fermentation process is rather complex producing, in addition to ethyl alcohol, other substances including fusel oil, glycerin and various organic acids. The fermented liquid containing about 7 to 12 percent ethyl alcohol, the remaining portion being mostly water, is concentrated by distillation. The process of distillation not only concentrates the ethyl alcohol, but also removes a large portion of the unpleasant-tasting impurities. Repeated purification by distillation to remove most of the unwanted impurities also removes all of the flavoring elements which are necessary in potable liquors. Consequently, in the distillation of potable liquors, the process of removing unwanted impurities is only partially completed in order to save the desired flavoring elements. However, other methods are used to further remove unwanted impurities.

The removal of unwanted impurities is especially important in vodka since it is a pure beverage to which no flavors are added to mask the taste of impurities. It is a smooth, unaged, odorless and colorless mixture of about 40 to 50% alcohol and 50 to 60% water, with an extremely mild flavor.

To further purify vodka from impurities the original distillate is flowed through successive beds of activated charcoal. The charcoal traditionally used is made from hard wood, such as beech, maple, oak and hickory. U.S. Pat. No. 2,946,687 describes the use of a modified, partially activated hard-wood charcoal. While this process has been found to be effective to reduce the various impurities present in the alcohol-water mixture, the bottled vodka was found to have a haze of deposit impairing the appearance of the vodka. The source of this deposit was found to be the charcoal used in the process containing polyvalent calcium and manganese ions. U.S. Pat. No. 3,914,442 seeks to eliminate this problem by treating the charcoal treated alcohol with a highly-crosslinked nuclear sulfonic macroporous polystyrene cationic exchange resin and to maintain the pH of the vodka in the range of 7.2 to 9.

Other approaches to purification includes blowing nitrogen gas through the alcohol-water solution. The nitrogen gas is said to become saturated with the vapors of ethyl alcohol and the volatile impurities are then drawn through an adsorbent which removes some of the impurities. U.S. Pat. No. 3,930,042 uses a carbon dioxide-containing gas counter-currently to a stream of alcohol in an amount sufficient to provide an alcohol-water mixture having a pH of between 4.0 to 5.5 to reduce impurities and to provide a stable vodka.

While these and other similar approaches to reduce impurities were at least partially successful in producing a popular beverage generally known as Russian vodka, the need still exists to produce vodka more economically which has less impurities, possess excellent organoleptic properties and increased shelf-life.

SUMMARY OF THE INVENTION

In accordance with the present invention, there is provided a method of treating a mixture of ethyl alcohol and water for the reduction of impurities contained therein comprising the steps of:
 a) mixing ethyl alcohol and water at a temperature of from about 5° C. to about 10° C. to obtain a mixture;
 b) flowing the mixture through an activated charcoal adsorber comprising three layers of having surface activities of
   1) from about 0.6 to about 0.8 mg-equivalent/liter,
   2) from about 0.8 to about 1.0 mg-equivalent/liter, and
   3) from about 1.0 to about 1.4 mg-equivalent/liter respectively, and a total pore volume of from about 1.4 to 1.6 cm$^3$/g at a temperature of from about 5° C. to about 20° C.;
 c) allowing the mixture to contact the activated charcoal adsorber for about 2 to 15 minutes, preferably for about 5 to 10 minutes; and
 d) recovering the initial capacity of the activated charcoal adsorber by flowing a stream of dry air, having a temperature of from about 100° C. to about 400° C., through the activated charcoal adsorber.

Preferably, the total pore volume of the activated charcoal adsorber, having a total pore volume of about 1.4 to about 1.6 cm$^3$/g, should comprise a micropore volume of form about 0.2 to about 0.3 cm$^3$/g, a mesopore volume of from about 0.3 to about 0.6 cm$^3$/g and a macropore volume of from about 0.5 to about 1.0 cm$^3$/g.

DETAILED DESCRIPTION OF THE INVENTION

Vodka is a food product widely consumed throughout the world. Its quality, determined by organoleptic and physio-chemical properties, therefore is important. The basic technology of vodka production was developed in the last century with only minor changes introduced in more recent times.

The present invention addresses the provision of desirable properties in vodka by utilizing the process steps described in the Summary of the Invention and as further referred to as the description of the invention proceeds.

The mixing of alcohol and water, prior to flowing through activated charcoal, is a complex physio-chemical process in itself involving: physically forming a mixture of water and alcohol and chemically forming compounds, such as acetals and hemiacetals, from small amounts of ingredients present in alcohol and water. The oxidation process forming these compounds is favored by elevated temperatures used by the prior art. The present invention uses a low temperature of from about 5° C. to 10° C. to minimize the extent of oxidation thereby reducing the formation of undesirable compounds.

After mixing, the mixture is flowed through three successive beds of activated charcoal in order to adsorb impurities at a temperature of from about 5° C. to about 20° C. The grains of activated charcoal typically have an effective interior surface area of about 30,000 to 40,000 cm²g and an external surface area of about 10 to 20 cm²/g. The interior surface area is, accordingly, $10^4$ to $10^5$ times greater than the external surface area. The pore size of the activated charcoal typically is about 0.5 to 1.5 nm, while the molecular size of impurities ranges from about 0.4 to about 1.0 nm. Therefore, the molecules of impurities can penetrate into the pores of the activated charcoal and adsorbed onto the large interior surface thereof. The surface activity is influenced by the amount of base oxides present on the surface of the activated charcoal. I have found that in the practice of the present invention, three successive beds or layers of activated charcoal having low, middle and high activities work best. The low surface activity should be in the range of from about 0.6 to about 0.8 mg-equivalent/liter, the middle one should be of from about 0.8 to about 1.0 mg-equivalent/liter, while the high surface activity charcoal should have a range of from about 1.0 to about 1.4 mg-equivalent/liter. The mixture is flowed from the bottom layer, having low activity, through the middle layer then through the top, highest activity charcoal at a temperature of from about 5° C. to about 20° C.;

For efficient treatment, the activated charcoal should have a total pore volume of from about 1.4 to about 1.6 cm³/g of charcoal and a pore distribution volume of from about 0.2 to about 0.3 cm³/g micropore, of from about 0.3 to about 0.6 cm³/g mesopore, and from about 0.5 to about 1.0 cm³/g macropore. As used herein, micropore means a pore size of less than 2 nm; mesopore means a pore size of about 2 to 50 nm; and macropore means a pore size of greater than 50 nm.

The optimum contact time between the mixture and the activated charcoal was found to be of from about 2 to about 15 minutes, and preferably of from about 5 to about 10 minutes. This parameter is rather surprising when compared to the contact time used by the vodka industry, namely of about 100 minutes or more.

If the contact time is less than about 2 to 5 minutes, the amount of impurities adsorbed onto the activated charcoal is less than sufficient to obtain a vodka product with good organoleptic qualities. If, on the other hand, the contact time is longer than 10 to 15 minutes, the catalytic process taking place between the activated charcoal and the mixture results in the generation of aldehydes, ketones and other unwanted impurities, again decreasing the organoleptic index of the vodka.

I have also found that the activated charcoal can be treated to regain nearly its initial adsorbent capacity by using the simple step of blowing dry heated air through the layers of activated charcoal from the top lowest surface activity bed to the bottom highest surface activity bed at a temperature of from about 100° C. to 400° C. Each layer of the charcoal (low, middle and high surface activity) were found to be regenerated by this process ready for successive uses.

The following examples will further illustrate the present invention. Example 1 utilizes the process according to the present invention. Example 2 is a comparative example utilizing a process used by the prior art.

EXAMPLE 1

41.8–42.2% v/v of grain alcohol containing 95–96% v/v ethanol was cooled to a temperature of 5° to 10° C. and mixed with 57.8–58.2% v/v of demineralized water to form a mixture. The mixture was then flowed up through three beds of activated charcoal having low, medium and high surface activities. Duration of contact time was about 8 minutes. The mixture then was filtered to remove suspended solid particles at a temperature of from about 5° C. to about 20° C.;

Several batches of the product were made and their pH's were measured. The average pH at 20° C. was from 7.1 to 7.5.

EXAMPLE 2 (COMPARATIVE EXAMPLE)

41.8–42.2% v/v of grain alcohol containing 95–96% v/v ethanol was kept at room temperature and mixed with 57.8–58.2% v/v of demineralized water to form a mixture. Was flowed through three columns linked in series containing activated granular charcoal. Duration of contact time was about 90 minutes. The mixture was filtered to remove suspended solid impurities.

Again, as in Example 1, several batches of the product were produced.

Samples of product of Example 1 and comparative Example 2 were analyzed. The results obtained are shown in Table 1, where:

column I denotes mg/liter of impurities in the grain alcohol prior to mixing;

column II denotes mg/liter of impurities of the mixture formed at room temperature and at between 5° to 10° C.; and column III denotes mg/liter of impurities in the product after flowing the same through activated charcoal.

TABLE I

| | Impurities Content | | | | |
|---|---|---|---|---|---|
| | Room Temperature (20° C.–25° C.) | | | 5° C.–10° C. | |
| Impurities | I | II | III | II | III |
| Methylethyl ether | 0.1 | 0.0 | 0.0 | 0.005 | 0.0 |
| Diethyl ether | 0.3 | 0.1 | 0.4 | 0.1 | 0.0 |
| Methylpropyl ether | 0.0 | 0.6 | 3.0 | 0.0 | 0.0 |
| Methylformate | 0.0 | 0.0 | 5.0 | 0.0 | 0.0 |
| Carbonic Acid | 0.3 | 0.9 | 0.0 | 0.1 | 0.0 |
| Ethylpropyl ether | 1.9 | 0.0 | 3.8 | 0.75 | 0.0 |
| Acetaldehyde | 7.9 | 8.0 | 15.6 | 3.0 | 1.0 |
| Propionaldehyde | 5.4 | 5.0 | 0.0 | 2.0 | 0.0 |
| Ethylformate | 3.2 | 0.0 | 0.0 | 1.5 | 0.0 |
| Methylacetate | 12.3 | 0.0 | 0.0 | 5.0 | 0.0 |
| Acetone | 0.0 | 0.0 | 0.0 | 0.0 | 0.0 |
| Ethylacetate | 7.4 | 10.2 | 17.7 | 3.0 | 0.0 |
| | Room Temperature | | | 5° C.–10° C. | |
| Impurities | I | II | III | II | III |
| Propylformate | 0.7 | 0.0 | 0.0 | 0.3 | 1.0 |
| Methylpropionate | 0.2 | 0.0 | 3.0 | 0.005 | 1.0 |
| Ethylpropionate | 0.2 | 0.0 | 0.0 | 0.005 | 1.0 |
| Propylacetate | 0.4 | 2.3 | 0.0 | 0.1 | 0.0 |
| Methanol | 20.1 | 10.5 | 8.0 | 8.0 | 1.0 |

As various changes might be made in the process of the invention herein disclosed, without departing from the spirit and principles of the invention, it is understood that all matter herein described shall be deemed illustrative, and not limiting except as set forth in the appended claims.

What is claimed is:

1. A method of producing vodka comprising the steps of:

a) mixing ethyl alcohol, obtained from grain or potato by fermentation, and water at a temperature of from about 5° C. to about 10° C. to obtain a mixture;

b) flowing the mixture through three layers of an activated charcoal adsorber having surface activities of
   1) from about 0.6 to about 0.8 mg-equivalent/liter,
   2) from about 0.8 to about 1.0 mg-equivalent/liter, and
   3) from about 1.0 to about 1.4 mg-equivalent/liter respectively, and a total pore volume of from about 1.4 to 1.6 cm$^3$/g at temperature of from about 5° C. to about 20° C.;

c) allowing the mixture to contact three layers of the activated charcoal adsorber for about 2 to 15 minutes at a temperature of from about 5° C. to about 20° C.; and d) recovering the initial capacity of the activated charcoal adsorber by flowing a stream of dry air, having a temperature of from about 100° C. to about 400° C., through the activated charcoal adsorber.

2. The method of claim 1 wherein the mixture is in contact with said activated charcoal for about 5 to 10 minutes.

3. The method of claim 1 wherein said total pore volume of said activated charcoal comprises:
   a micropore volume of from about 0.2 to about 0.3 cm$^3$/g;
   a mesopore volume of from about 0.3 to about 0.6 cm$^3$/g;and
   a macropore volume of from about 0.5 to about 1.0 cm$^3$/g.

* * * * *